US008460551B2

(12) United States Patent
Al-Arifi et al.

(10) Patent No.: US 8,460,551 B2
(45) Date of Patent: Jun. 11, 2013

(54) SOLAR MEMBRANE DISTILLATION SYSTEM AND METHOD OF USE

(75) Inventors: Ibrahim A. Al-Arifi, Riyadh (SA); Hisham Taha Abdulla El-Dessouky, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 399 days.

(21) Appl. No.: 12/787,659

(22) Filed: May 26, 2010

(65) Prior Publication Data

US 2011/0290725 A1    Dec. 1, 2011

(51) Int. Cl.
*B01D 61/36* (2006.01)

(52) U.S. Cl.
USPC ......... 210/640; 210/175; 210/167.32; 203/22

(58) Field of Classification Search
None
See application file for complete search history.

(56) References Cited

U.S. PATENT DOCUMENTS

| | | | | |
|---|---|---|---|---|
| 4,267,022 A | * | 5/1981 | Pitcher | 203/11 |
| 5,300,197 A | * | 4/1994 | Mitani et al. | 202/177 |
| 6,716,355 B1 | * | 4/2004 | Hanemaaijer et al. | 210/640 |
| 7,448,441 B2 | | 11/2008 | Hendricks et al. | |

OTHER PUBLICATIONS

C. Bier et al., "Solar-Powered Desalination by Membrane Distillation (MD)", IDA World Congress on Desalination and Water Sciences, Abu Dhabi, Nov. 1995, pp. 1-12.
S. Deng, "Solar Desalination of Brackish Water Using Membrane Distillation Process", http://wrri.nmsu.edu/research/projects/deng08.pdf, 1 page (no date on website).
J. Koschikowski et al., "Solar thermal-drivien desalination plants based on membrane distillation", May 2003, pp. 295-304, Elsevier Science B.V.
M.S. El-Bouraw, "A framework for better understanding membrane distillation seperation process", Journal of Membrane Science, 285, Aug. 8, 2006, pp. 4-29, Elsevier B.V.
J. Walton et al., "Solar and Waste . . . Distillation", Desalination and Water Purification Research and Development Program Report No. 81, Apr. 2004, pp. 1-50.
Office Action for related U.S. Appl. No. 13/611,563 dated Jan. 8, 2013, 8 pages.
Notice of Allowance for related U.S. Appl. No. 13/611,563 dated Mar. 27, 2013; 6 pages.

* cited by examiner

*Primary Examiner* — Krishnan S Menon
(74) *Attorney, Agent, or Firm* — Andrew M. Calderon; Roberts Mlotkowski Safran & Cole, P.C.

(57) ABSTRACT

A water distillation system includes a membrane distillation unit which produces desalinated water from feed water comprising salt water. The system also includes a primary water heater which raises a temperature of the feed water upstream of the feed water entering the membrane distillation unit. The system additionally includes an evaporative cooler which lowers a temperature of a coolant upstream of the coolant entering the membrane distillation unit.

16 Claims, 3 Drawing Sheets

SOLAR MEMBRANE DISTILLATION SYSTEM AND METHOD OF USE

FIELD OF THE INVENTION

The invention relates to distillation systems and, more particularly, to a solar driven membrane distillation system and method of use.

BACKGROUND

Seawater desalination is a process that extracts fresh water from salt water. The fresh water is used for human consumption, irrigation, and other uses. Conventional desalination methods include multi-stage flash distillation and membrane distillation. Membrane distillation systems are becoming increasingly popular due to their relatively low energy consumption. For example, a membrane distillation device may be operated at atmospheric pressure and relatively low temperature.

There are numerous large desalination facilities throughout the world. Fresh water is often transported long distances from these facilities to the eventual end users. The modest efficiencies of current desalination systems drive desalination efforts toward the use of such large-scale facilities. It would be beneficial, however, to provide the opportunity to develop independent water resources to small cities and remote areas in order to achieve improvements in their well being.

Accordingly, there exists a need in the art to overcome the deficiencies and limitations described hereinabove.

SUMMARY

In a first aspect of the invention, there is a water distillation system includes: a membrane distillation unit which produces desalinated water from feed salt water; a primary water heater which raises a temperature of the feed water upstream of the feed water entering the membrane distillation unit; and an evaporative cooler which lowers a temperature of a coolant upstream of the coolant entering the membrane distillation unit.

In a another aspect of the invention, there is a water distillation system that includes: a membrane distillation unit which produces desalinated water from salt water and a primary water heater comprising a solar water heater. The system also includes a feed water pre-heater which: lowers a temperature of a coolant after the coolant has exited the membrane distillation unit and raises a temperature of the feed water prior to the feed water entering the primary water heater; and an evaporative cooler which further lowers the temperature of the coolant downstream of the feed water pre-heater and upstream of the membrane distillation unit. The primary water heater further raises the temperature of the feed water downstream of the feed water pre-heater and upstream of the membrane distillation unit.

In another aspect of the invention, there is a method of desalinating water. The method includes: transferring heat from a relatively hot fresh water to a feed water to increase a temperature of the feed water and decrease a temperature of the coolant; further increasing the temperature of the feed water; further decreasing the temperature of the coolant via evaporative cooling; and producing desalinated water from the feed water using a temperature gradient between the feed water and the coolant.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
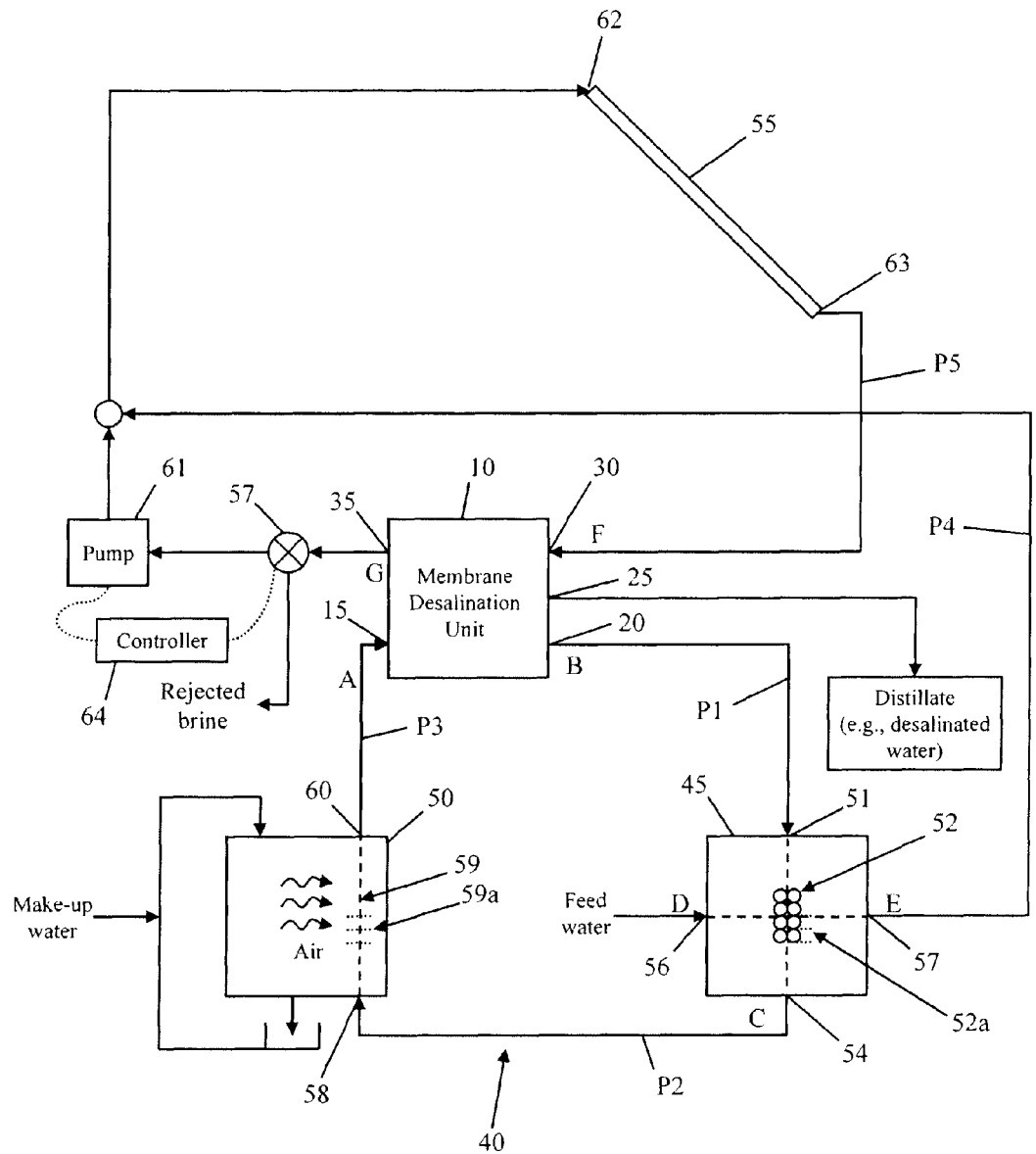
FIG. 1 shows a system in accordance with aspects of the invention.

The invention relates to distillation systems and, more particularly, to a solar-driven membrane distillation system and method of use. In embodiments, a desalination system includes a solar water heater, a feed water pre-heater, an evaporative cooler, a membrane distillation unit, and auxiliary units including but not limited to pumps, control systems, and valves. Advantageously, the system and method of the present invention increases efficiency of the desalination system by lowering the temperature of the coolant and/or raising the temperature of the feed water prior to these fluids being introduced into the membrane distillation unit. In embodiments, the feed water pre-heater simultaneously lowers the temperature of the coolant and raises the temperature of the feed water, and the evaporative cooler also lowers the temperature of the coolant. In this manner, the temperature difference between the coolant and the feed water may be increased, which enhances the operation of the system.

More specifically, in accordance with aspects of the invention, the membrane distillation unit produces desalinated water from salt water based on a temperature difference between the salt water (e.g., feed water) and process water (e.g., coolant). Additionally, in embodiments the invention utilizes heat exchangers to increase the temperature difference within the membrane distillation unit. This latter feature increases the output of the membrane distillation unit. Moreover, the heat exchangers permit the system to operate even when energy from the sun is not available to heat the salt water.

In exemplary implementations, the feed water pre-heater heats the feed water (e.g., seawater and/or other salt water) from an ambient temperature to a temperature higher than ambient. The energy for heating the feed water in the feed water pre-heater is provided by coolant after the coolant has exited the membrane distillation unit at an elevated temperature. As such, the feed water pre-heater provides several advantages include, for example, it heats the feed water and cools the coolant. In embodiments, these advantages are accomplished using a pre-heater that comprises carbon nano tube heat exchange elements in which the heat content of the coolant is recovered and used to preheat the feed water.

In embodiments, after the feed water is initially heated in the feed water pre-heater, the feed water is then further heated to a design temperature at a primary heater downstream of the feed water pre-heater. In accordance with aspects of the invention, the primary heater comprises a solar water heater that further elevates the temperature of the feed water using energy from the sun. After being heated by the primary heater, the feed water is routed to the membrane distillation unit at a relatively high temperature.

Advantageously, the membrane distillation unit extracts desalinated water from the feed water based on a temperature difference between the feed water and the coolant. According to aspects of the invention, the coolant travels in a closed-loop system from an outlet of the membrane distillation unit, to the feed water pre-heater where the coolant is cooled by a first amount, to an evaporative cooler where the coolant is further cooled, and to an inlet of the membrane distillation unit. In embodiments, the coolant is at its highest temperature when exiting the membrane distillation unit due to the coolant extracting heat from water vapor in the membrane distillation unit in a condensing operation. In implementations of the invention, the coolant is routed from an outlet of the membrane distillation unit to the feed water pre-heater where, as described above, heat is transferred from the coolant to the feed water. Thus, the feed water pre-heater cools the coolant by a first amount.

In accordance with further aspects of the invention, the coolant is routed from the pre-heater to an evaporative cooler type heat exchanger, which further lowers the temperature of the coolant prior to the coolant re-entering the membrane distillation unit. By further lowering the temperature of the coolant using the evaporative cooler, implementations of the invention provide a large temperature gradient within the membrane distillation unit. This large temperature gradient increases the net driving force inside the membrane distillation unit, which causes the membrane distillation unit to produce desalinated water more efficiently.

More specifically, the use of the evaporative cooler in embodiments of the invention increases the temperature gradient for simultaneous heat and mass transfer inside the membrane distillation unit. In this manner, implementations of the invention increase the efficiency of the desalination system, which reduces the cost of desalinating water. Moreover, implementations of the invention provide for operating the system without energy storage even when the energy of the sun is unavailable to heat the feed water. Additionally, operation of the system at low temperature minimizes the tendency for scale formation on system components.

FIG. 1 shows a system in accordance with aspects of the invention. In embodiments, the system includes a membrane distillation unit 10. In exemplary implementations, the membrane distillation unit 10 unit comprises a direct contact membrane distillation (DCMD) unit, as described in greater detail below. However, the invention is not limited to this configuration, and any suitable membrane distillation unit may be used within the scope of the invention.

Still referring to FIG. 1, the membrane distillation unit 10 includes a coolant inlet 15, a coolant outlet 20, a distillate (e.g., desalinated water) outlet 25, a feed water inlet 30, and a brine outlet 35. A coolant loop 40 comprises a closed-loop system that carries coolant (e.g., process water) from the coolant outlet 20 of the membrane distillation unit 10 to the coolant inlet 15 of the membrane distillation unit 10. In embodiments, the coolant loop 40 includes at least one of: a feed water pre-heater 45 and an evaporative cooler 50.

In accordance with aspects of the invention, coolant exits the membrane distillation unit 10 from the coolant outlet 20 and travels through plumbing P1 to a first inlet 51 of the pre-heater 45. As used herein, plumbing refers to any conduit, pipe, valve, diverter, pump, or equivalent apparatus for conveying fluid, including any combination of the aforementioned elements. The coolant travels from the first inlet 51, along a first path through and/or around heat exchange elements 52 of the pre-heater 45, to a first outlet 54 of the pre-heater 45. In embodiments, the feed water pre-heater 45 comprises a shell and tube heat exchanger. The heat exchange elements 52 may comprise, for example, carbon nano tube materials 52a to enhance the rate of heat transfer. However, the invention is not limited to this type of heat exchanger, and any suitable heat exchanger may be used within the scope of the invention.

In embodiments, the pre-heater 45 cools the coolant by transferring heat from the coolant to feed water that is simultaneously traveling through the pre-heater 45. More specifically, the feed water enters the pre-heater 45 at a second inlet 56. The feed water travels from the second inlet 56, along a second path through and/or around the heat exchange elements 52 of the pre-heater, to a second outlet 57 of the pre-heater 45. The coolant entering the pre-heater 45 at the first inlet 51 is at a higher temperature than the feed water entering at second inlet 56. In this manner, the heat exchange elements 52 facilitate heat transfer from the coolant to the feed water, which decreases the temperature of the coolant and increases the temperature of the feed water. As such, the coolant at the first outlet 54 is at a lower temperature than the coolant at the first inlet 57. Conversely, the feed water at the second outlet 57 is at a higher temperature than the feed water at the second inlet 56. The coolant and feed water do not mix within the pre-heater 45.

According to aspects of the invention, the coolant travels via plumbing P2 from the first outlet 54 of the pre-heater to an inlet 58 of the evaporative cooler 50. In embodiments, the evaporative cooler 50 comprises an indirect evaporative cooler. The evaporative cooler 50 is a system used to further lower the temperature of the coolant upstream of the membrane distillation unit 10 before the coolant flows into the membrane distillation unit 10.

In embodiments, coolant enters the evaporative cooler 50 at an inlet 58 and runs internally through one or more tubes 59 of the evaporative cooler 50. The tubes are cooled by either submerge them in salt water cooled by the evaporative cooling system or by spray water over an external surface of the one or more tubes 59. Unsaturated, e.g., relatively dry, air is forced to flow over the salt water on the surfaces of the tubes 59.

In accordance with aspects of the invention, a portion of the salt water on the external surface of the tubes 59 evaporates into the air that is being forced across the tubes 59. This evaporation cools the salt water remaining on the external surface of the tubes 59 since the heat necessary to evaporate the portion of salt water is extracted from the salt water. The cooled salt water on the external surface of the tubes 59 operates to lower the temperature of the coolant flowing inside the tubes 59. For example, the evaporation causes the salt water on the external surface of the tubes to be at a temperature lower than the coolant inside the tubes. This temperature gradient causes heat to transfer from the coolant to the salt water, which lowers the temperature of the coolant within the tubes 59. In this manner, the coolant exits the evaporative cooler 50 at an outlet 60 at a lower temperature than it entered at inlet 58.

In embodiments, the tubes 59 in the evaporative cooler 50 may be provided with carbon nano tube materials 59a to enhance the rate of heat transfer. However, the invention is not limited to this type of heat exchanger, and any suitable heat exchanger may be used within the scope of the invention.

Use of the evaporative cooler 50 in implementations of the invention allows the system to work even when the primary heater 55 provides little or no temperature increase to the feed water. For example, when energy from the sun is not available to drive the solar heater of the primary heater 55, the evaporative cooler 50 still lowers the temperature of the coolant below that of the feed water such that a temperature gradient exists in the membrane desalination unit. Thus, in accordance with aspects of the invention, the evaporative cooler 50 permits the system to operate without sunlight, for example, at night. Moreover, when sunlight is available for heating the feed water in the primary heater 55, the evaporative cooler 50 increases the efficiency of the system by increasing the temperature differential between the feed water and the coolant in the membrane desalination unit.

According to aspects of the invention, the coolant travels via plumbing P3 from the outlet 60 of the evaporative cooler 50 to the coolant inlet 15 of the membrane distillation unit 10. The lowering of the temperature of the coolant with the evaporative cooler 50 increases the temperature gradient between the coolant and feed water inside the membrane distillation unit 10, which improves the efficiency of the membrane distillation unit 10.

In embodiments, the feed water is conveyed via plumbing P4 from the second outlet 57 of the feed water pre-heater 45 to an inlet of the primary water heater 55. The primary water heater 55 further heats the feed water prior to the feed water being routed to the membrane distillation unit 10. In exemplary implementations, the primary water heater 55 comprises a solar water heater that heats the feed water using energy collected from the sun. Solar water heaters for use with distillation systems are known, such that further explanation is not believed necessary. Moreover, although a solar water heater is described, the invention is not limited to a solar water heater for heating the feed water and, as such, any suitable heat source may be used additionally or alternatively to a solar water heater. For example, the primary water heater 55 may utilize waste heat from an engine, such as a generator engine, to heat the feed water. The primary water heater 55 may comprise a solar water heater that is locally made.

According to aspects of the invention, the feed water travels via plumbing P5 from an outlet 63 of the primary water heater 55 to feed water inlet 30 of the membrane distillation unit 10. The raising of the temperature of the feed water with the pre-heater 45 and/or the primary water heater 55 increases the temperature gradient between the feed water and the coolant inside the membrane distillation unit 10, which improves the efficiency of the membrane distillation unit 10.

In accordance with aspects of the invention, brine exits the membrane distillation unit 10 at brine outlet 35. In embodiments, the brine passes through valve 57, where some of the brine may be discharged as rejected brine while some of the brine may be routed back to the inlet of the primary water heater 55 via pump 61. In embodiments, a mass of rejected brine to be discharged is determined by the allowable salt concentration in the system. This is fixed by the maximum operating temperature, feed water concentration, and the chemical used to control, e.g., inhibit, scale formation. Whatever brine is not rejected is mixed with feed water from the pre-heater 45 and fed to the primary water heater 55.

Table 1 lists temperatures of the various fluids at respective locations within the system as annotated in FIG. 1. These temperatures are for illustration only, and are not intended to limit the scope of the invention. Instead, embodiments of the invention may be implemented at temperatures other than those shown in FIG. 1. Moreover, the system does not always operate in a steady state mode. That is, the temperatures of the various fluids throughout the system depend on the respective outlet temperatures of the primary water heater 55 and the evaporative cooler 50, one or both of which may vary during the day and night. Therefore, the temperatures described herein are merely exemplary, and are not intended to limit the scope of the invention.

TABLE 1

| Location in the System of FIG. 1 | Temperature (° C.) |
| --- | --- |
| A | 15-25 |
| B | 35-45 |

TABLE 1-continued

| Location in the System of FIG. 1 | Temperature (° C.) |
| --- | --- |
| C | 20-30 |
| D | 15-25 |
| E | 20-40 |
| F | 40-80 |
| G | 25-50 |

The system may further comprise pumps, valves, controllers, and plumbing for moving the coolant and feed water throughout the system. A computer controller 64 comprising any appropriate combination of hardware and software may be used to control the flow of respective fluids within the system. For example, a computer controller 64 may be used to control pumps and valves throughout the system in order to regulate, e.g., fluid flow rates, temperatures of fluids, evaporation rates, etc.

Figure 2:
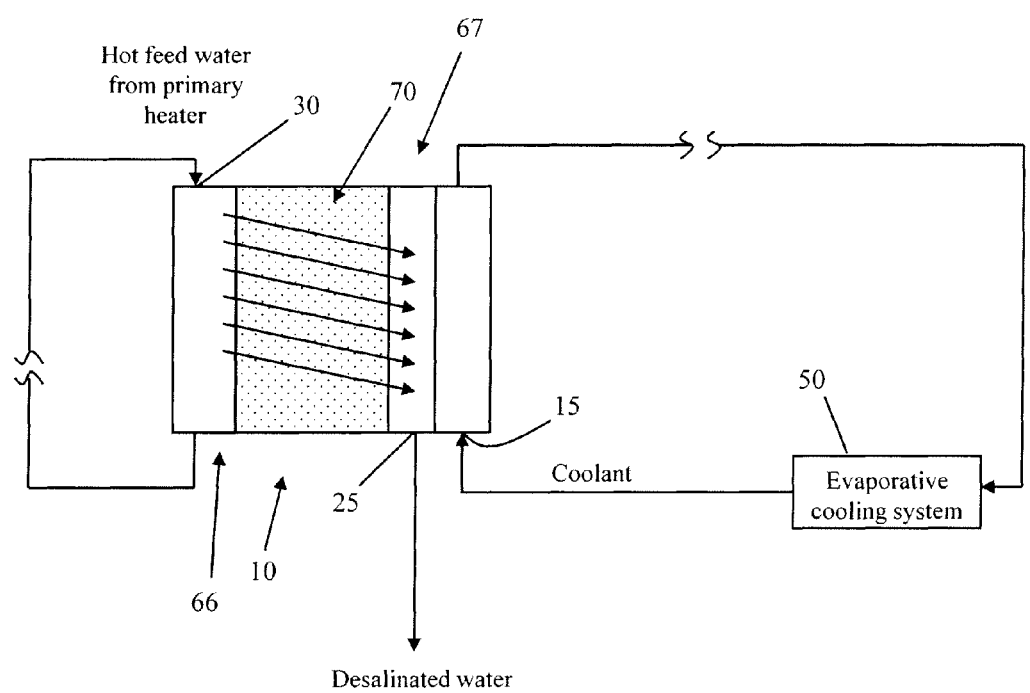
FIG. 2 shows another system in accordance with aspects of the invention.

FIG. 2 shows an exemplary configuration of the membrane distillation unit 10 in accordance with aspects of the invention. In implementations, relatively high temperature feed water enters the membrane distillation unit 10 at the feed water inlet 30. Prior to this, the feed water has been heated by the primary water heater 55 and/or the pre-heater 45. Also, relatively low temperature coolant enters the membrane distillation unit 10 at coolant inlet 15. In embodiments, desalinated water is transferred as water vapor from a hot water side 66 to a coolant side 67 of the membrane distillation unit 10. In implementations, the water vapor condenses in the coolant side 67 as distillate water, and exits the membrane distillation unit 10 at fresh water outlet 25.

In embodiments, the membrane distillation unit 10 comprises a direct contact membrane distillation (DCMD) unit and employs a selective membrane separation process driven by a vapor pressure gradient across a hydrophobic micro porous membrane 70. The membrane 70 stays as a barrier between a hot feed and a cold permeate. The hydrophobic characteristic of the membrane 70 prevents any liquid from entering the pores unless the membrane is under a hydrodynamic pressure higher than its liquid penetration point (LPP). This creates gas-liquid interfaces on both sides of the membrane 70. Air that has filled the membrane pores stays immobilized throughout the DCMD operation. Once a water vapor pressure (WVP) gradient exists across the membrane, water molecules start to evaporate from the gas-liquid interface on the feed side, diffuse through the immobilized air in the pores, condense on the permeate side, and eventually are swept away with the permeate stream. The temperature difference between the two streams is the primary factor that creates the driving force for DCMD mass transfer. Thus, there co-exist WVP and temperature gradients, and thereby mass and heat transfers across the membrane 70 in DCMD.

In accordance with aspects of the invention, the membrane distillation unit 10 comprises a hollow fiber membrane system. However, the invention is not limited to this configuration, and any suitable type of membrane distillation unit may be used.

In embodiments, the amount of water withdrawn from the system equals the mass of fresh water produced in the membrane distillation unit 10. This amount keeps the mass of fresh water flowing to the membrane 70 constant, and typically has a value fixed by the membrane manufacturer. Implementations of the invention may be used to produce about 1000 cubic meters of desalinated water per day, although the invention is not limited to this amount and instead the system may be scaled to any desired size and capacity. That is, the system can be scaled up or down to meet the demand for fresh water.

In accordance with further aspects of the invention, the operation of the system at relatively low temperatures avoids the tendency for scale formation. In embodiments, air cooling may be produced as a beneficial by-product of the system. Moreover, the driving force of the membrane distillation unit 10 is independent of the salt concentration of the feed water and is improved through the use of the evaporative cooling of the coolant.

Figure 3:
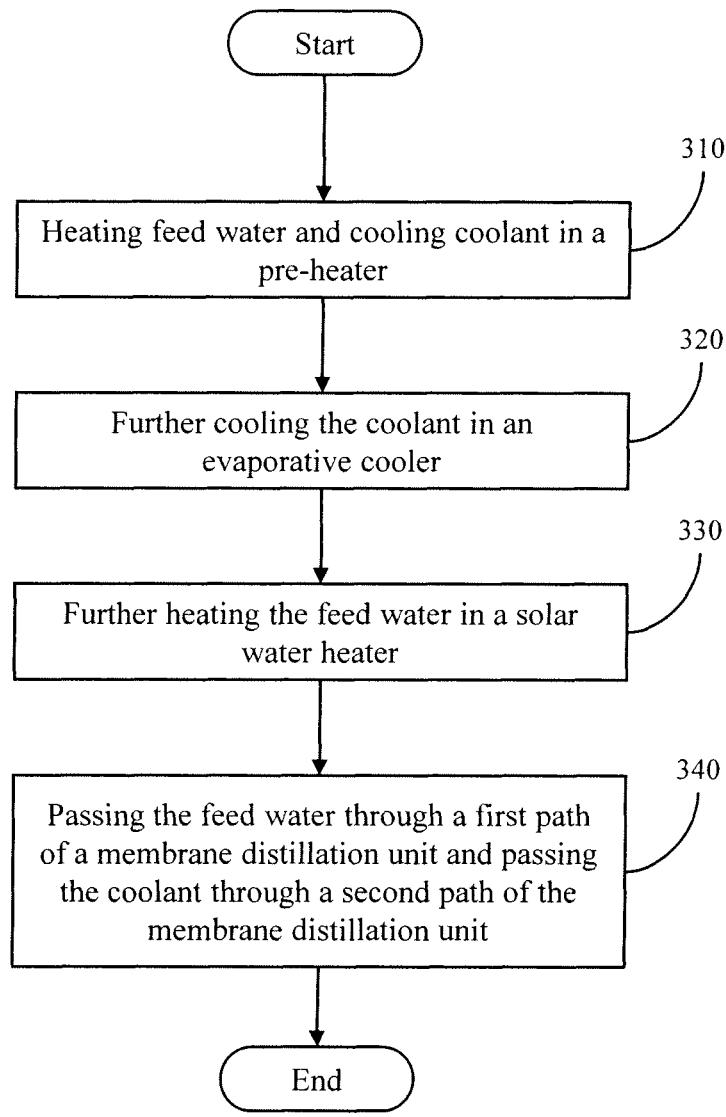
FIG. 3 shows a flow chart depicting steps of a method in accordance with aspects of the invention.

Embodiments of the invention may also be implemented as a method, as shown for example in FIG. 3. In accordance with aspects of the invention, a method for desalinating water includes cooling a coolant to be used in a membrane distillation unit with an evaporative cooler upstream of the membrane distillation unit. More specifically, at step 310, feed water is heated in a pre-heater (e.g., feed water pre-heater 45). Coolant can also be cooled in the same pre-heater. At step 320, the coolant is further cooled in an evaporative cooler, such as evaporative cooler 50 described herein. At step 330, the feed water is further heated in a primary water heater, such as primary water heater 55 described herein. At step 340, desalinated water is produced using a membrane desalination unit by passing the heated feed water and the cooled coolant are through the membrane desalination unit, such as membrane desalination unit 10 described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A water distillation system, comprising:
a membrane distillation unit which produces desalinated water from feed water comprising salt water;
a primary water heater which raises a temperature of the feed water upstream of the feed water entering the membrane distillation unit; and
an evaporative cooler which lowers a temperature of a coolant upstream of the coolant entering the membrane distillation unit,
wherein the evaporative cooler comprises at least one tube through which the coolant flows,
the evaporative cooler sprays salt water on an outer surface of the at least one tube, and
the evaporative cooler forces dry, unsaturated air to flow over the salt water on the outer surface of the at least one tube such that a portion of the salt water evaporates and lowers the temperature of the coolant inside the at least one tube.

2. The system of claim 1, wherein the primary water heater comprises a solar water heater.

3. The system of claim 1, further comprising a feed water pre-heater structured to:
lower the temperature of a coolant after the coolant has exited the membrane distillation unit; and
raise the temperature of a feed water prior to the feed water entering the primary water heater.

4. The system of claim 3, wherein:
the feed water pre-heater is upstream of the primary water heater;
the feed water pre-heater is downstream of the membrane distillation unit; and
the feed water pre-heater is upstream of the evaporative cooler.

5. The system of claim 4, wherein the feed water pre-heater comprises nano tubes as heat exchange elements.

6. The system of claim 1, wherein the evaporative cooler comprises nano tubes as heat exchange elements.

7. The system of claim 6, wherein the nano tubes comprise carbon nano tubes.

8. The system of claim 1, wherein the membrane distillation unit comprises a semi-permeable membrane which permits the passage of water vapor and prevents the passage of liquid water.

9. The system of claim 8, wherein:
the feed water passes through a first portion of the membrane distillation unit on a first side of the membrane;
the coolant passes through a second portion of the membrane distillation unit on a second side of the membrane opposite the first side;
a temperature gradient between the feed water and the coolant causes water vapor to pass from the feed water through the membrane to an external surface of the membrane.

10. A water distillation system, comprising:
a membrane distillation unit which produces desalinated water from feed water comprising salt water;
a primary water heater comprising a solar water heater;
a feed water pre-heater which: (i) lowers a temperature of a coolant after the coolant has exited the membrane distillation unit and (ii) raises a temperature of the feed water prior to the feed water entering the primary water heater; and
an evaporative cooler which further lowers the temperature of the coolant downstream of the feed water pre-heater and upstream of the membrane distillation unit,
wherein the primary water heater further raises the temperature of the feed water downstream of the feed water pre-heater and upstream of the membrane distillation unit, and
the evaporative cooler comprises at least one tube through which the coolant flows,
the evaporative cooler sprays salt water on an outer surface of the at least one tube, and
the evaporative cooler forces dry, unsaturated air to flow over the salt water on the outer surface of the at least one tube such that a portion of the salt water evaporates and lowers the temperature of the coolant inside the at least one tube.

11. The system of claim 10, wherein at least one of the evaporative cooler and the feed water pre-heater comprises nano tubes as heat exchange elements.

12. The system of claim 11, wherein the nano tubes comprise carbon nano tubes.

13. The system of claim 10, wherein the membrane distillation unit comprises a semi-permeable membrane which permits the passage of water vapor and prevents the passage of liquid water.

14. A water distillation system, comprising:
a membrane distillation unit which produces desalinated water from feed water comprising salt water;
a primary water heater comprising a solar water heater;
a feed water pre-heater which: (i) lowers a temperature of a coolant after the coolant has exited the membrane distillation unit and (ii) raises a temperature of the feed water prior to the feed water entering the primary water heater; and
an evaporative cooler which further lowers the temperature of the coolant downstream of the feed water pre-heater and upstream of the membrane distillation unit,
wherein the primary water heater further raises the temperature of the feed water downstream of the feed water pre-heater and upstream of the membrane distillation unit;
the membrane distillation unit comprises a feed water inlet and a brine outlet, a coolant inlet and a coolant outlet, and a desalinated water outlet;
the evaporative cooler comprises at least one tube through which the coolant flows;
the evaporative cooler sprays salt water on an outer surface of the at least one tube; and
the evaporative cooler forces dry, unsaturated air to flow over the salt water on the outer surface of the at least one tube such that a portion of the salt water evaporates and lowers the temperature of the coolant inside the at least one tube.

15. The system of claim 14, further comprising a valve downstream of the brine outlet of the membrane distillation unit, wherein the valve is configured to discharge a portion of rejected brine and route another portion of brine to an inlet of the primary water heater.

16. The system of claim 15, wherein:
the portion of rejected brine is based on an allowable salt concentration in the system; and
the other portion of brine is mixed with the feed water from the feed water pre-heater and fed to the primary water heater.

* * * * *